United States Patent
Ahirwar et al.

(10) Patent No.: US 10,502,810 B1
(45) Date of Patent: Dec. 10, 2019

(54) NON-LINEAR PHASE COMPENSATION

(71) Applicant: Marvell International Ltd., Hamilton (BM)

(72) Inventors: Vijay Ahirwar, Bhopal (IN); Sri Varsha Rottela, Visakhapatnam (IN); Sudhir Srinivasa, Sunnyvale, CA (US)

(73) Assignee: Marvell International Ltd., Hamilton (BM)

(*) Notice: Subject to any disclaimer, the term of this patent is extended or adjusted under 35 U.S.C. 154(b) by 255 days.

(21) Appl. No.: 15/722,859

(22) Filed: Oct. 2, 2017

Related U.S. Application Data

(60) Provisional application No. 62/408,491, filed on Oct. 14, 2016.

(51) Int. Cl.
  *G01S 5/02* (2010.01)
  *G01S 5/10* (2006.01)
  *H04B 17/30* (2015.01)

(52) U.S. Cl.
  CPC ............... *G01S 5/021* (2013.01); *G01S 5/10* (2013.01); *H04B 17/30* (2015.01)

(58) Field of Classification Search
  CPC ............ G01S 5/021; G01S 5/10; H04B 17/30
  See application file for complete search history.

(56) References Cited

U.S. PATENT DOCUMENTS

| | | |
|---|---|---|
| 9,929,882 B1 | 3/2018 | Zhang |
| 2015/0189610 A1* | 7/2015 | Siomina ............... G01S 5/021 370/280 |

OTHER PUBLICATIONS

"Method and Apparatus for Accurately Estimating a Distance Between Wireless Network Devices", U.S. Appl. No. 14/501,655, filed Sep. 30, 2014, 27 pages.

* cited by examiner

*Primary Examiner* — Ian N Moore
*Assistant Examiner* — Latresa A McCallum

(57) ABSTRACT

Systems and techniques for compensating for non-linear phase responses and resulting frequency-dependent group delay using data for a specific device are described. The error in the delay value of a channel determined from a received data packet due to frequency-dependent group delay is removed by subtracting a delay value determined from measurements of a specific device from the delay value of the channel. Furthermore, compensated delay values are calculated for multiple training fields in the received data packet, enabling combining of delay values determined from different training fields that may operate at different frequencies (e.g., with different subcarriers). Hence, the systems and techniques described herein are suitable to provide accurate timing estimates that support calculations for location services, including sub-meter location of a device using a wireless network.

20 Claims, 7 Drawing Sheets

400

```
┌─────────────────────────────────────────────┐
│  Obtain a first delay value determined for  │
│    a plurality of frequencies in a tone map │
│                     402                     │
└─────────────────────────────────────────────┘
                       │
                       ▼
┌─────────────────────────────────────────────┐
│  Obtain pre-determined frequency response   │
│  values indicative of a non-linear phase    │
│                   response                  │
│                     404                     │
└─────────────────────────────────────────────┘
                       │
                       ▼
┌─────────────────────────────────────────────┐
│ Determine a second delay value from at least│
│ some of the pre-determined frequency        │
│ response values, each of the at least some  │
│ of the pre-determined frequency response    │
│ values determined for a respective one of   │
│ the plurality of frequencies in the tone map│
│                     406                     │
└─────────────────────────────────────────────┘
                       │
                       ▼
┌─────────────────────────────────────────────┐
│ Subtract the second delay value from the    │
│ first delay value to form a compensated     │
│                 delay value                 │
│                     408                     │
└─────────────────────────────────────────────┘
```

FIG. 4

NON-LINEAR PHASE COMPENSATION

CROSS REFERENCE TO RELATED APPLICATION(S)

This application claims priority to U.S. Provisional Patent Application Ser. No. 62/408,491 filed Oct. 14, 2016, the disclosure of which is incorporated herein by reference.

BACKGROUND

Communication systems are often used for purposes for which they were not originally intended, which can place new, stringent requirements on legacy communication systems. In one example, a wireless local area network (WLAN) can be used to locate a device connected to the WLAN (e.g., determine the position of the device), when location was not originally intended for the WLAN. For instance, later versions of a protocol may support location services, while earlier versions of the protocol may not. Since precise location, such as sub-meter positioning, usually requires accurate timing estimates to determine time of flight for triangulation equations, timing requirements of devices connected to the WLAN can be more strict than originally intended for the devices.

Factors that previously could be ignored can prevent satisfying the stricter timing requirements needed for location services. For instance, in multi-carrier systems, such as WLAN's using orthogonal frequency division multiplexed (OFDM) signals, including the Institute of Electrical and Electronics Engineers (IEEE) 802.11 family of protocols (e.g., see www.standardsieee.org), timing requirements for earlier protocol versions could usually be met by positioning a fast Fourier transform (FFT) window according to a phase roll common across all subcarriers caused by a group delay independent of frequency. The frequency-independent group delay may be introduced by filters having a linear phase response. Even if the positioning of the FFT window were off by a few samples, a guard interval, such as including a cyclic prefix, prevented inter-symbol interference, so that the positioning was sufficiently good to decode data packets, meeting the original purposes intended by the system. However, for later protocol versions that support location services, positioning the FFT window incorrectly, such as off by a few samples, can introduce timing errors sufficient to prevent acceptable sub-meter location.

Furthermore, group delay introduced by filters in the analog front end of a device in practice is frequency dependent, rather than frequency independent. The frequency dependent group delay can be caused by a non-linear phase response, such as the phase response of infinite-impulse response (IIR) filters, higher-order filters (e.g., 3rd-order or higher Chebyshev analog filters), non-linear circuits such as limiters and analog-to-digital converters, combinations thereof, and the like. Traditionally, such non-linearities are ignored in deriving timing parameters, such as FFT window position, in OFDM communication systems. Errors in timing estimates resulting from the frequency-dependent group delays of non-linear phase responses, however, can introduce timing errors sufficient to prevent acceptable sub-meter location. To exacerbate this problem, the non-linearities are usually device-specific (e.g., different devices exhibit different non-linearities), making generic solutions unacceptable. Moreover, when combining separate delay values, such as from different training fields that use different subcarriers to form a single delay value to position an FFT window, the non-linear phase responses introduce different delays at different frequencies and thus can result in an unacceptable combination.

SUMMARY

This Summary is provided to introduce a selection of concepts in a simplified form that are further described below in the Detailed Description. This Summary is not intended to identify key features or essential features of the claimed subject matter.

This disclosure describes, in some aspects, a method of compensating for non-linear phase of a filter. A first delay value determined for a plurality of frequencies in a tone map is obtained. Pre-determined frequency response values indicative of a non-linear phase response are obtained, and a second delay value is determined from at least some of the pre-determined frequency response values. Each of the at least some of the pre-determined frequency response values are determined for a respective one of the plurality of frequencies in the tone map. The second delay value is subtracted from the first delay value to form a compensated delay value.

This disclosure further describes, in other aspects, a system for compensating for non-linear phase. The system includes a receiver configured to receive a data packet. The system also includes a phase roll module configured to determine a plurality of first delay values for (i) respective training fields of the data packet and (ii) respective tone maps. The system also includes a calibration module configured to obtain frequency response values indicative of a non-linear phase response of a data path of the receiver. The system also includes a non-linear phase module configured to determine a plurality of second delay values from a respective plurality of the frequency response values. Each of the respective plurality of the frequency response values correspond to a respective one of the respective tone maps. The system also includes a delay compensation module configured to subtract a respective one of the plurality of second delay values from a respective one of the plurality of first delay values to form a plurality of intermediate delay values. The delay compensation module is also configured to combine the plurality of intermediate delay values to form a compensated delay value.

This disclosure further describes, in still other aspects, a device for compensating for non-linear phase. The device includes a phase roll module configured to obtain a first delay value from a channel frequency response for a plurality of frequencies in a tone map. The channel frequency response is determined from a training field in a data packet received by the device. The device also includes a calibration module configured to obtain frequency response values indicative of a non-linear phase response of a data path of the device. The device also includes a tone frequency module configured to select a subset of the frequency response values that correspond to the plurality of frequencies in the tone map. The device also includes a non-linear phase module configured to determine a second delay value from the subset of frequency response values. The device also includes a delay compensation module configured to subtract the second delay value from the first delay value to form a compensated delay value.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 4 is a flow diagram depicting an example procedure in accordance with one or more aspects of the disclosure.

DETAILED DESCRIPTION

Overview

Figure 1:
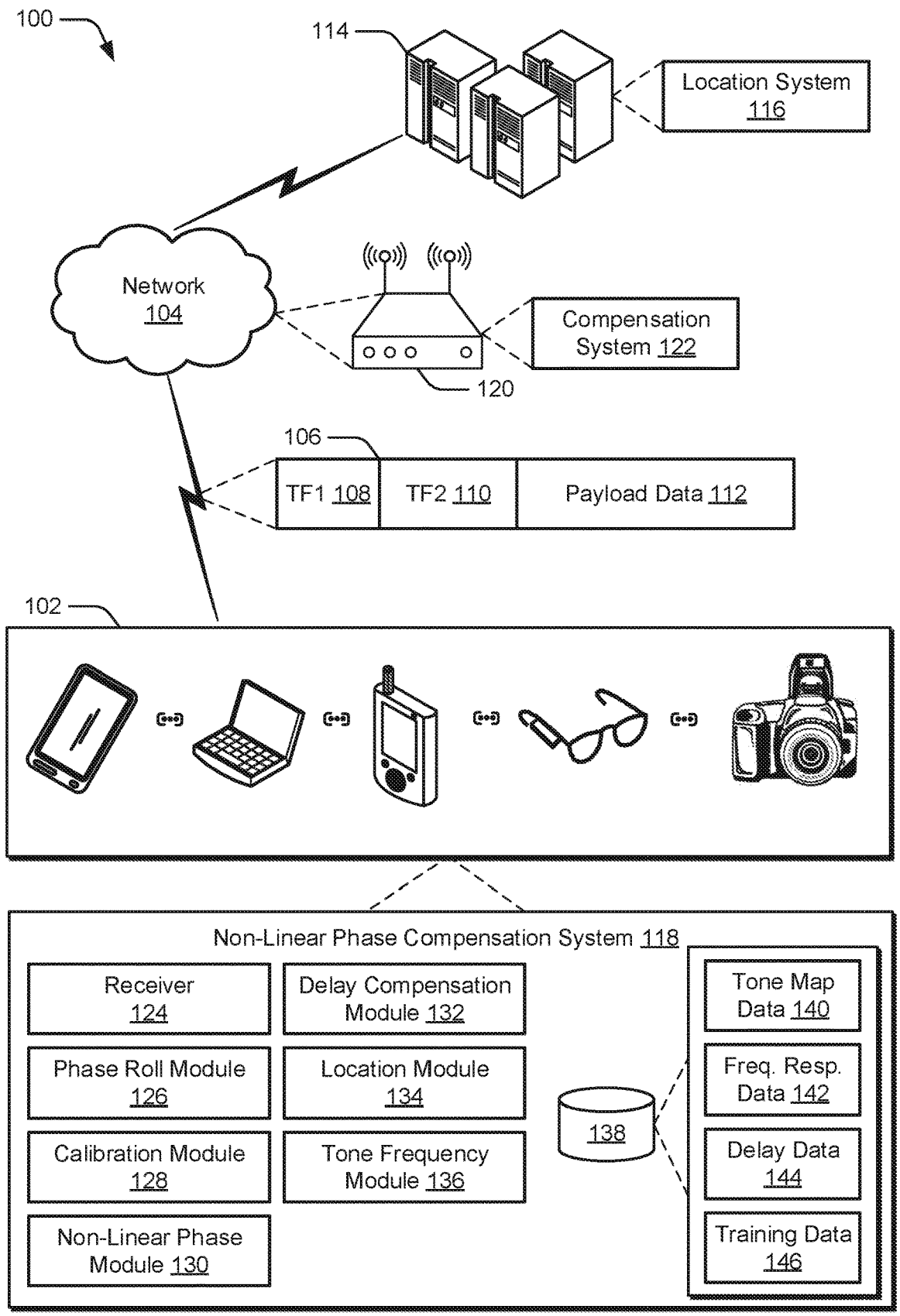
FIG. 1 is an illustration of an example operating environment in accordance with one or more aspects of the disclosure.

A communication system including a network, such as a system including a WLAN implementing signals compliant with an IEEE 802.11 protocol, can be used to locate a device connected to the network (e.g., determine the device's position). Frequency-dependent group delay induced by non-linear phase responses in the propagation path of a data packet, such as included in front end circuitry of a device communicatively coupled with the WLAN, can corrupt delay estimates used to position a transform window, such as a window of data for a FFT. Traditionally, errors in the positioning of the FFT window due to non-linear phase responses could be ignored, since the communication system was designed with timing margin allowing placement of the FFT window across an interval (e.g., a guard interval) with little or no impact on system performance, such as packet error rate. However, such errors in positioning of the FFT window due to non-linear phase responses, if ignored, can result in unacceptable location capabilities. Exacerbating this problem, the non-linear phase response of a device is usually specific to the device, making a generic solution that does not account for device specifics infeasible.

Furthermore, to support older, legacy versions of standards or protocols, some communication systems may use more than one training field that operate at different frequencies, such as with different subcarriers or combinations of subcarriers. To achieve timing requirements for location services, some systems may try to combine multiple delays determined from respective training fields, and use the combined delay to position an FFT window for timing of symbol boundaries. However, without compensating for frequency-dependent group delays induced by non-linear phase responses, such combining can achieve combined delay values that are not acceptable to meet timing requirements needed for some location capabilities, such as sub-meter location.

Accordingly, this disclosure describes systems, devices, and techniques for compensating for non-linear phase responses and the resulting frequency-dependent group delay using data for a specific device, providing accurate delay calculation even when combining delay values determined from multiple training fields operating with different subcarriers. A first delay value for each training field in a received data packet is calculated according to a plurality of frequencies, such as according to a tone map for each training field. For instance, the first delay value can be calculated according to a phase roll across multiple subcarriers in each training field, such as caused by a constant (e.g., fixed) group delay induced by a linear phase response of a filter or propagation channel In one example, a channel estimate is determined for each training sequence, and used to construct an inner product. A respective first delay for each training sequence is determined from the angle of the inner product for each training sequence.

A calibration routine is performed on a specific device to determine frequency response values indicative of a non-linear phase response of the specific device. The frequency response values can be pre-determined. For instance, the calibration routine can be performed when the device is offline, during manufacture, and the like. Data can be injected into a filter of the device during calibration and an output of the filter is measured. From this input and output record, the frequency response values can be determined, and stored to be made available at any suitable time. For instance, during operation, the device may obtain the frequency response values (e.g., stored locally on the device or made available to the device, such as via a network).

A second delay value for each training field is determined from the frequency response values. During operation of the device, a respective second delay value for each training field in a received data packet is determined using frequency response values corresponding to the same frequencies (e.g., subcarriers in a tone map) used to determine the respective first delay value for the respective training field. In one example, the frequency response values for each training field selected according to the tone map for the training field are used to construct an inner product. The second delay for each training sequence is determined from the angle of the inner product for each training sequence. The second delay values include errors (e.g., contributions of frequency-dependent group delays) introduced due to the non-linear phase response for the specific device, since they are derived from calibration data for the specific device.

For each training field, a respective second delay value is subtracted from a respective first delay value, thus removing the error in the delay due to the non-linear phase response. In one example, a compensated delay value is selected as the delay value resulting from the subtraction for one of the training fields. Additionally or alternatively, because the error in the delay due to the non-linear phase response has been removed in the delay values resulting from the subtraction for each training field, the delay values resulting from the subtraction for each training field can be combined (e.g., averaged in any suitable way) to form a compensated delay unaffected by frequency-dependent group delay. The compensated delay value is suitable to provide accurate timing (e.g., positioning of the FFT window in OFDM systems) supporting calculations of time of flight in triangulation equations to locate a device communicating with a WLAN, e.g., determining the location of the device to within less then a meter of error.

The systems and techniques described herein constitute an improvement over current approaches which do not compensate for frequency-dependent group delays induced by non-linear phase responses, such as induced specific to a receiver by a front end circuit, and do not combine (or improperly combine) delay values calculated for different training fields of a data packet. The nature of the described aspects to compensate for non-linear phase by subtracting a delay value including an error caused by the frequency-dependent group delay for a specific device from a delay value derived from a received data packet by the device results in a compensated delay value suitable to determine accurate timing supporting calculations of time of flight in triangulation equations to locate a device communicating with a WLAN, such as to achieve sub-meter location.

In the following discussion an example environment and example system are described that may employ the techniques described herein. Example implementation details and procedures are then described which may be performed in the example environment as well as other environments, with the example system as well as other systems. Consequently, performance of the example procedures is not limited to the example environment and example system, and the example environment and example system are not limited to performance of the example procedures.

Example Environment

FIG. 1 is an illustration of an example operating environment 100 in accordance with one or more aspects of the disclosure. The illustrated environment 100 includes a computing device 102 communicatively coupled with a network 104. Computing device 102 can include any suitable computing device, such as by way of example and not limitation, a mobile phone, tablet, laptop computer, gaming device, goggles, glasses, watch, camera, personal digital assistant, and the like. Hence, computing device 102 may range from full resource devices with substantial memory and processor resources (e.g., personal computers, game consoles) to a low-resource device with limited memory or processing resources (e.g., mobile devices).

Various types of input devices and input instrumentalities can be used to provide input to computing device 102. For example, computing device 102 can recognize input as being a mouse input, stylus input, touch input, input provided through a natural user interface, and the like. Thus, computing device 102 can recognize multiple types of gestures including touch gestures and gestures provided through a natural user interface.

Furthermore, computing device 102 may be representative of one or a plurality of different devices, such as one or more devices connected to a network, such as network 104, that perform operations "over the cloud".

Computing device 102 is communicatively coupled to network 104 and data is transferred between computing device 102 and network 104 using data packets consisting of control information and user data, such as example data packet 106. Data packet 106 is illustrated including a first training field 108, a second training field 110, and payload data 112. For simplicity, discussion of data packet 106 is limited to these components, though data packet 106 can include any other component or field not illustrated in FIG. 1, such as by way of example and not limitation, a header, addresses, preamble, guard interval, parity, control, and the like. Furthermore, first training field 108 as illustrated preceding second training field 110, which is illustrated as preceding payload data 112. However, the components of data packet 106 can be configured in any suitable order, such as having second training field 110 precede first training field 108. In addition, though only two training fields are illustrated in data packet 106, data packet 106 can include any suitable number of training fields. In one example, data packet 106 includes at least three training fields.

A training field (e.g., first training field 108 and second training field 110) includes information that can be used by computing device 102 to recover payload data 112. For instance, a training field can include a known sequence of data symbols modulated onto a known set of subcarriers to form a known pattern. The data is known in the sense that it is stored or accessible by computing device 102, or can be generated by computing device 102. A training field can include a known pattern repeated with a function of the known pattern, such as repeating an inverted version of the pattern, a shifted (e.g., cyclical shift) version of the known pattern, combinations thereof, and the like. The training fields can be any suitable length. In the example data packet 106, first training field 108 is illustrated as shorter than second training field 110 to indicate that first training field 108 is of less time duration than second training field 110. However, first training field 108 and second training field 110 are not so limited, and can by any suitable durations.

Since information in the training fields (e.g., first training field 108 and second training field 110) is known to computing device 102, the training fields can be used to adjust demodulation functions implemented in computing device 102, such as carrier recovery, automatic gain control, channel identification, equalization, and timing recovery. For instance, a coarse timing estimate (e.g., position of FFT window in number of sample delays) can be derived from first training field 108, and adjusted to form a fine timing estimate from second training field 110. The fine timing estimate can be used to set the position of an FFT window to recover the payload data 112. In one example, carrier recovery and automatic gain control are performed over first training field 108, allowing the timing estimate to be refined over the second training field 110. Additionally or alternatively, timing estimates (e.g., delay values) from first training field 108 and second training field 110 can be combined to form a compensated delay value that may be used to determine a symbol boundary by adjusting a position of an FFT window to recover payload data 112, as well as support time of flight calculations in triangulation equations for locating computing device 102 (described in more detail below). In one example, a symbol boundary is determined using techniques and systems described in U.S. Provisional Patent Application No. 61/380,900 entitled "Symbol Timing Correction Based on LLTF" to Palanivelu et al., filed Sep. 8, 2010, the disclosure of which is incorporated herein by reference in its entirety.

Network 104 communicatively couples computing device 102 with server 114. Hence, communication between network 104 and server 114 may also be done with packetized data, using data packets similar to data packet 106. Network 104 may comprise a variety of networks, including the Internet, an intranet, local area network (LAN), WLAN, wide area network (WAN), personal area network (PAN), cellular networks, terrestrial networks, satellite networks, combinations of networks, and the like, and as such may be wired, wireless, or a combination thereof. In one example, network 104 includes a WLAN configured to support location services for providing position information of computing device 102. For instance, network 104 may include access points having known positions so that, together with time of flight information of data packets communicated between computing device 102 and the access points, triangulation can be performed to locate computing device 102 (e.g., determine its 2-dimensional (2D) or 3-dimensional (3D) position). Triangulation calculations can be performed by any suitable device, such as a component of network 104, computing device 102, or server 114.

Server 114 may include one or more servers or service providers that provide services and/or resources to computing device 102. Generally, resources provided by server 114 may be licensed, purchased, or may be made freely available, (e.g., without authentication, license, or account-based access). The resources can include any suitable combination of services and content, such as made available over network 104 by one or more providers. Some examples of services include, but are not limited to, an online shopping service, a photo editing service, a web development and management service, a collaboration service, a social networking service, a messaging service, an advertisement service, a graphics design service, an on-line shopping service, and so forth. Content may include various combinations of assets, including videos, ads, audio, multi-media streams, animations, images, web documents, web pages, applications, device applications, text documents, drawings, presentations, user profiles, user preferences, user data, maps, and the like.

Furthermore, server 114 includes location system 116 configurable to receive information (e.g., timing information from computing device 102 and/or a component of network 104) and calculate a position of computing device 102. Location system may store location information of components in network 104, such as access points, and use the location information together with timing information from computing device 102 to calculate a position of computing device 102 (e.g., by solving any suitable triangulation equations).

Computing device 102 includes non-linear phase compensation system 118. Non-linear phase compensation system 118 is illustrated in FIG. 1 as part of computing device 102, though non-linear phase compensation system 118 can be implemented in any suitable computing device. In one example, network 104 includes access point 120 that includes compensation system 122. Access point 120 can be any suitable type of access point, such as an access point to a WLAN implemented with network 104. Compensation system 122 in access point 120 may include any suitable system for compensating for phase error. In one example, compensation system 122 includes non-linear phase compensation system 118 so that non-linear phase compensation system 118 can be implemented by computing device 102, access point 120, or a combination of computing device 102 and access point 120 (e.g., computing device 102 and access point 120 may share data over network 104 to implement non-linear phase compensation system 118). Additionally or alternatively, location system 116 of server 114 may include non-linear phase compensation system 118 in part or in whole so that non-linear phase compensation system 118 can be implemented by computing device 102, access point 120, server 114, or combinations thereof.

Non-linear phase compensation system 118 includes receiver 124, phase roll module 126, calibration module 128, non-linear phase module 130, delay compensation module 132, location module 134, and tone frequency module 136. Non-linear phase compensation system 118 also includes, or has access to, data storage 138, which can store any suitable type of data, including tone map data 140, frequency response data 142, delay data 144, and training data 146 (e.g., data included in a training field), location data, applications, instructions for executing triangulation equations, and the like.

Receiver 124 is representative of functionality configured to receive a data packet and process the data packet in any suitable way to extract payload data from the data packet. For instance, receiver 124 may include demodulation functions such as carrier recovery, automatic gain control, channel identification, equalization, timing recovery, error correction, decoding, data formatting, and the like. Though receiver 124 is illustrated in FIG. 1 as a component included in non-linear phase compensation system 118, components of non-linear phase compensation system 118 can additionally or alternatively be included in receiver 124. Receiver 124 can be any suitable type of receiver, and may include a transmitter. Receiver 124 can also provide a received data packet for processing by components of non-linear phase compensation system 118, such as phase roll module 126.

Phase roll module 126 is representative of functionality configured to determine a plurality of first delay values for respective training fields of a data packet and respective tone maps used in the training fields. A tone map describes the frequencies used in the training field, such as the subcarriers used to communicate the training data, and can be stored in tone map data 140. A first delay value can represent a delay corresponding to a common phase roll across subcarriers, such as due to a linear phase response. Phase roll module 126 can obtain the first delay values in any suitable way. In one example, phase roll module 126 determines a first delay value using techniques and systems described in U.S. patent application Ser. No. 14/501,655 entitled "Method and Apparatus for Accurately Estimating a Distance between Wireless Network Devices" to Zhang et al., filed Sep. 30, 2014, the disclosure of which is incorporated herein by reference in its entirety.

In an example, phase roll module 126 obtains a channel frequency response (e.g., channel frequency response values) from a training field in a data packet received by computing device 102. For instance, a channel frequency response can be obtained using known methods by comparing training field data obtained from a received data packet with expected (or known) data for the training field (e.g., data stored in training data 146). Phase roll module 126 obtains a first delay value from the channel frequency response for a plurality of frequencies in the tone map for a training field. In one example, the plurality of frequencies is a subset of frequencies in the tone map used for the training field. Phase roll module 126 can form an inner product of channel frequency values and a shifted version of channel frequency values, and determine a first delay value from an angle of the inner product.

For instance, suppose channel frequency response values are represented by the vector $\vec{H}$, $$\vec{H} = [H_0 H_1 \ldots H_{n-1}]$$

where $H_i$ are complex-valued frequency domain coefficients at frequencies $0 \ldots n-1$. In one example, the vector $\vec{H}$ is obtained by taking a transform (e.g., FFT) of a channel impulse response $h(t)$.

A delay of the channel can be determined from the angle of an inner product of the channel frequency response values and a shifted version of the channel frequency response values, or $$D = -ang([H_2 H_3 \ldots H_{n-1}] \times [H_1^* H_2^* \ldots H_{n-2}^*]^T)$$

where $(.)^T$ denotes transpose, $(.)^*$ denotes conjugation, and ang(.) is an angle operator that extracts the angle from its argument. In one example, ang(.) is determined by calculating arctan $$\left(\frac{\text{Im}(\bullet)}{\text{Re}(\bullet)}\right),$$

the arctangent of the ratio of the imaginary part of the argument to the real part of the argument (e.g., here the argument is the inner product).

In one example, a delay is determined by phase roll module 126 that does not use all the channel frequency response values $H_0 H_1 \ldots H_{n-1}$. For instance, the tone map for a particular training field may be restricted to a subset of subcarriers, so that some subcarriers are skipped or unused. Additionally or alternatively, a subset of the channel frequency response values may be deemed unreliable, such as due to noise that corrupts the channel frequency response values at some frequencies, and omitted from the delay determination in phase roll module 126. Hence, a delay of the channel can additionally or alternatively be determined from the angle of an inner product of the channel frequency response values and a shifted version of the channel frequency response values according to $$D = -ang([H_i H_j \ldots H_w] \times [H_{i-1}^* H_{j-1}^* \ldots H_{w-1}^*]^T)$$

where i, i−1, j, j−1, w, and w−1 are indices representing a desired set of frequencies, such as frequencies designated in a tone map describing subcarriers used for a particular training field. Hence, these indices need not be sequential (e.g., they can represent a sparse set of frequencies where some frequencies are skipped, so that the frequency spacing between the channel frequency response values used to determine the delay is not necessarily uniform). Therefore, a delay value can be determined using specific frequencies corresponding to a particular training field.

Delay values determined by phase roll module 126 can be stored in delay data 144 and made available to any component of non-linear phase compensation system 118. Furthermore, delay values determined by phase roll module 126 can be communicated to server 114 and used by location system 116. Furthermore, phase roll module 126 can provide each delay value calculated by phase roll module 126 to delay compensation module 132.

Because the delay value determined by phase roll module 126 is determined from a received data packet processed by receiver 124, it can include not only the effects of the signal propagation medium (e.g., for wireless communications, the environment where computing device 102 is located), but also errors due to non-linear phase responses of filters in receiver 124. As the delay value may be determined for a tone map that is frequency dependent, the errors due to non-linear phase responses of filters in receiver 124 can degrade the accuracy of the delay value determined by phase roll module 126 depending on the frequencies of the tone map, since the errors due to non-linear phase responses are frequency dependent.

Figure 2:
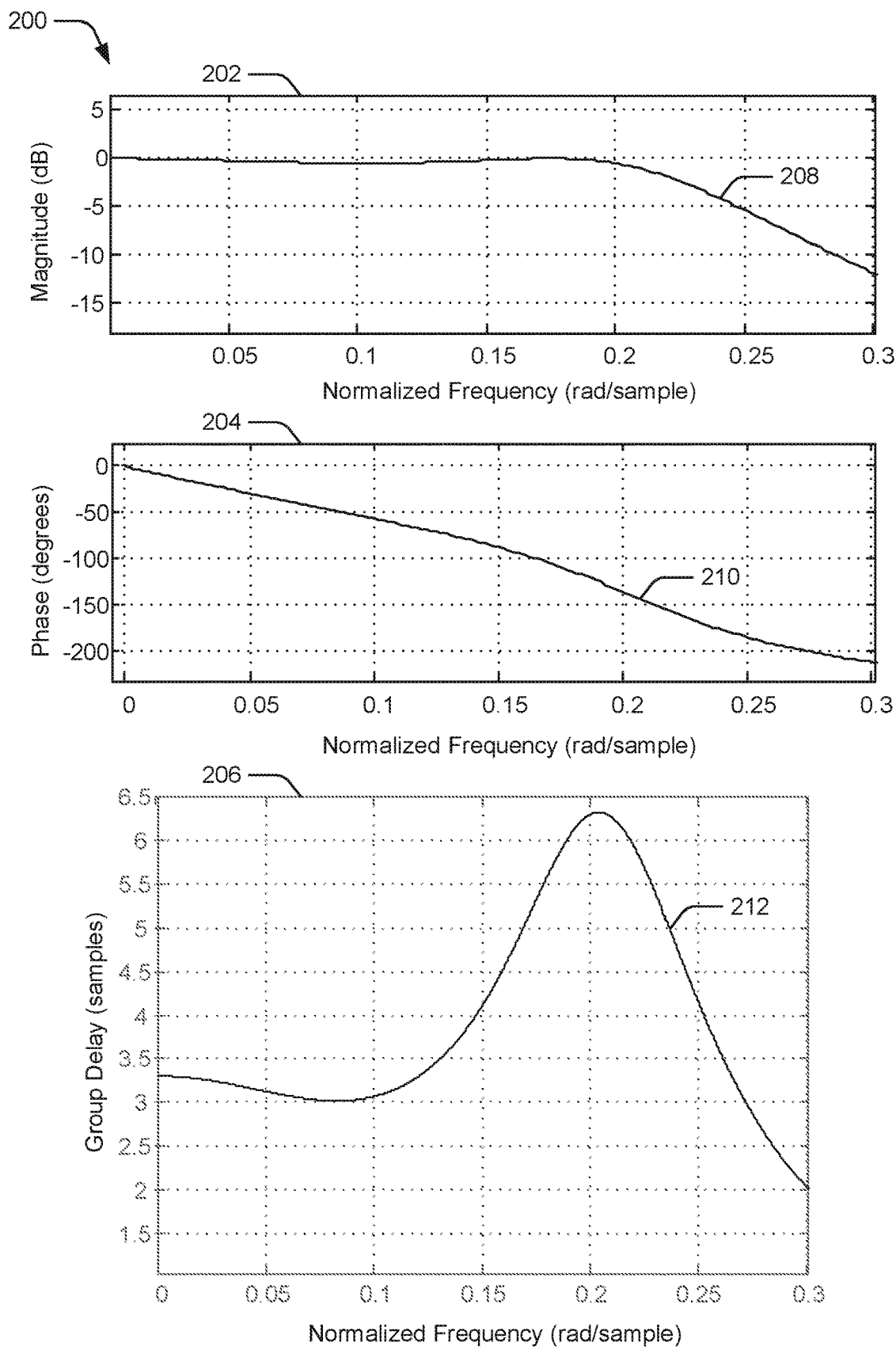
FIG. 2 illustrates example data in accordance with one or more aspects of the disclosure.

To illustrate the frequency dependence of the group delay resulting from a non-linear phase response, consider FIG. 2 which illustrates example data 200 in accordance with one or more aspects of the disclosure. Example data 200 is illustrated in three subplots, 202, 204, and 206 for a third order Chebyshev filter. Subplot 202 illustrates the magnitude response of the filter at trace 208, subplot 204 illustrates the phase response of the filter at trace 210, and subplot 206 illustrates the group delay of the filter at trace 212, all across a normalized frequency (e.g., times π) in radians per sample.

Low pass characteristics of the Chebyshev filter are illustrated by trace 208 in subplot 202. Furthermore, as seen by trace 210 in subplot 204, the phase response $\emptyset(\omega)$ of the filter is non-linear. The group delay of the filter is determined from the derivative of the phase response with respect to frequency. The group delay represented by trace 212 in subplot 206 is calculated as $$-\frac{d\phi(\omega)}{d\omega},$$

and is frequency dependent. For instance, at low frequencies up to about $\omega=0.1$, the delay of the filter is approximately 3 samples. At about $\omega=0.2$, however, the delay of the filter exceeds 6 samples, and then falls to nearly 2 samples at higher frequency $\omega=0.3$.

These delay variations can be significant, especially when a receiver front end includes multiple circuits inducing non-linear phase responses, such as IIR filters, higher-order filters (e.g., multiple Chebyshev analog filters), automatic gain circuits, analog-to-digital converters, limiters, and the like. The dependence on frequency of the group delay induced by the non-linear phase responses, if not compensated for, can cause an error in the delay of a timing estimate used in the receiver. These timing errors can result in time of flight calculations that are inaccurate and do not support location services for the receiver, such as location services capable of providing sub-meter device location. Accordingly, non-linear phase compensation system 118 compensates for errors in delay induced by non-linear phase responses, and supports accurate timing for time of flight calculations used in location services for the receiver, including sub-meter device location capabilities.

Referring again to FIG. 1, calibration module 128 is representative of functionality configured to obtain frequency response values indicative of a non-linear phase response of a data path of a receiver, such as receiver 124. Calibration module 128 can obtain the frequency response values in any suitable way. In one example, a calibration routine is performed on computing device 102 to determine the frequency response values. The calibration routine can include injecting data (e.g., a known pattern of symbols or tones) into receiver 124 and measuring an output of receiver 124 to construct an input and output record. By comparing the inputs and outputs, such as including dividing the output record with the input record in a suitable way, the frequency response values can be determined.

Data can be injected and measured at any suitable input port and output port of receiver 124, respectively. For example, data can be injected into front end circuitry of receiver 124 that process radio frequencies (RF) and/or intermediate frequencies (IF) to determine frequency response values indicative of a non-linear phase response. Furthermore, calibration module 128 may perform multiple calibration routines on computing device 102, obtain multiple frequency response values indicative of respective non-linear phase responses, and combine the multiple frequency response values, such as by multiplying or adding contributions of the multiple frequency response values. The multiple calibration routines can each be performed for different components or circuits of computing device 102.

Furthermore, calibration module 128 can perform a calibration routine at any suitable time, such as when computing device 102 is offline, during manufacture of computing device 102 or a component of computing device 102 (e.g., a System-on-Chip (SoC) included in computing device 102 that includes receiver 124), and the like. Hence, the frequency response values obtained by calibration module 128 can be pre-determined. During operation of computing device 102, such as responsive to computing device 102 waking up from an inactive state (e.g., a sleep mode), calibration module 128 may obtain the frequency response values from memory, (e.g., stored on computing device 102 in frequency response data 142, and/or stored at server 114 as part of location system 116).

In one example, calibration module 128 performs a calibration routine on computing device 102 to obtain and store frequency response values responsive to computing device 102 being inactive (e.g., not receiving a user input) for a predetermined amount of time. Additionally or alternatively, calibration module 128 can perform a calibration routine on computing device 102 according to events, such as scheduled events (e.g., pre-determined times of the day, week, or month), the computing device 102 being powered off, a user logging off of computing device 102, expiration of a previously obtained set of frequency response values (e.g., the previously obtained set of frequency response values are determined to be too old), a software upgrade performed on computing device 102 (e.g., new firmware controlling receiver 124 is installed on computing device 102), and the like.

Tone frequency module 136 is representative of functionality configured to select frequency response values obtained by calibration module 128, such as a subset of the frequency response values obtained by calibration module 128. For instance, tone frequency modules may use a tone map of a training field and select the subset of the frequency response values that correspond to the frequencies in the tone map for the training field. Hence, tone frequency module 136 is configurable to select the frequency response values that correspond to appropriate frequencies, such as frequencies in a tone map, frequencies used to determine a delay value obtained by phase roll module 126, frequencies determined to be valid (e.g., frequencies in a tone map and used to determine a delay value obtained by phase roll module 126), and the like. Tone frequency module 136 provides the selected frequency response values to non-linear phase module 130.

Non-linear phase module 130 is representative of functionality configured to determine at least one delay value from frequency response values obtained by calibration module 128 and selected by tone frequency module 136. Non-linear phase module 130 can determine a delay value in any suitable way. In one example, non-linear phase module 130 forms an inner product of frequency response values and a shifted version of frequency response values, and determines a delay value from an angle of the inner product.

For instance, suppose the frequency response values indicative of a non-liner phase response and obtained by calibration module 128 are represented by the vector $$\vec{G} = [G_0 G_1 \ldots G_{n-1}]$$

where $G_i$ are complex-valued frequency response values at frequencies $0 \ldots n-1$. Also suppose that tone frequency module 136 determines that frequencies represented by i, i−1, j, j−1, w, and w−1 are appropriate frequencies, such as designated in a tone map describing subcarriers used for a particular training field, used in computing a delay value by phase roll module 126, or a combination thereof. Non-linear phase module 130 can determine a delay value according to $$D = -ang([G_i G_j \ldots G_w] \times [G_{i-1}^* G_{j-1}^* \ldots G_{w-1}^*]^T).$$

Since the delay value determined by non-linear phase module 130 is based on measured frequency response values indicative of a non-linear phase response to a specific computing device 102, the delay value includes the error in the delay caused by the non-linear phase response of computing device 102, without including a contribution of a propagation environment preceding computing device 102 (e.g., signal distortions incurred before the signal reaches computing device 102). Furthermore, since the delay value determined by non-linear phase module 130 is determined for the same frequencies as a delay value determined by phase roll module 126 (e.g., for frequencies represented by indices i, i−1, j, j−1, w, and w−1), the error in the two delays caused by the non-linear phase response of computing device 102 is the same amount of delay. Hence, a delay value determined by non-linear phase module 130 can be used to remove the error in a delay determined by phase roll module 126 (e.g., from a received data packet).

Non-linear phase module 130 may compute a delay value as described above for one or more training fields in a data packet, according to respective tone maps for respective training fields. Hence, tone frequency module 136 can provide selected frequency response values to non-linear phase module 130 for each training field in a data packet. Non-linear phase module 130 provides each delay value calculated by non-linear phase module 130 to delay compensation module 132. Furthermore, delay values calculated by non-linear phase module 130 can be stored in delay data 144 and made accessible to any component of non-linear phase compensation system 118.

Delay compensation module 132 is representative of functionality configured to form a compensated delay value. For instance, delay compensation module 132 receives delay values from phase roll module 126 and non-linear phase module 130 and, based on these delay values, forms a compensated delay value. Delay compensation module 132 can receive delay values from phase roll module 126 and non-linear phase module 130 for one or more training fields in a data packet, and combine the delay values to form a compensated delay value that accounts for frequency-dependent group delay induced by a non-linear phase response. The compensated delay value formed by delay compensation module 132 supports accurate timing for time of flight calculations used in location services, including sub-meter device location capabilities.

Delay compensation module 132 can form a compensated delay value based on the delay values from phase roll module 126 and non-linear phase module 130 in any suitable way. In one example, delay compensation module 132 forms a compensated delay value by subtracting a delay value received from non-linear phase module 130 from a delay value received from phase roll module 126, or $$\Delta = D - D_0$$

where $\Delta$ is a compensated delay value and $D$ and $D_0$ are delay values obtained in phase roll module 126 and non-linear phase module 130, respectively, as described above. For instance, delay values and $D$ and $D_0$ may correspond to a same training field in a data packet since they are determined using same frequencies in a tone map controlling the training field (e.g., designating subcarriers used in the training field).

Since the delay value $D_0$ includes the error in the delay caused by the non-linear phase response of computing device 102 at the frequencies used to determine the delay $D$, this error is removed from the delay $D$ in the subtraction when forming the compensated delay value Δ. Hence, the compensated delay value Δ is free from the error in the delay caused by the non-linear phase response of computing device 102. Thus, the compensated delay value Δ supports accurate timing for time of flight calculations used in location services, including sub-meter device location capabilities.

Furthermore, because the error due to the non-linear phase response has been removed in the subtraction, compensated delay values calculated from different training fields (e.g., according to different tone maps) can be combined to improve accuracy. In contrast, without first removing the errors in the delay caused by the non-linear phase response before combining, such as by the subtraction described above, the errors can degrade the combination so that the combined delay is not acceptable for location services.

Hence, delay compensation module 132 can form a compensated delay value by subtracting a respective one of plurality of delay values received from non-linear phase module 130 from a respective one of plurality of delay values received from phase roll module 126 to form a plurality of intermediate delay values, and combine the plurality of intermediate delay values to form a compensated delay value.

In one example, delay compensation module 132 forms a compensated delay value according to $$\Delta = \frac{1}{\beta} \cdot \sum_{j=1}^{N} \alpha_j \cdot (D^j - D_0^j)$$

for j=1 ... N training fields in a data packet, and $D^j$ and $D_0^j$ are delay values from phase roll module 126 and non-linear phase module 130 for each training field, respectively. The coefficients $\alpha_j$ are weighting coefficients that can be used to bias the averaging. The coefficient $\beta$ can be used to normalize the sum. The coefficients $\alpha_j$ can be selected in any suitable way, such as proportional to a signal-to-noise ratio (SNR) calculated for each training field (e.g., the higher the SNR, the larger the coefficient). In one example, $\alpha_j=1 \forall j$ and $\beta=N$, so that a mean delay value over the training fields is calculated to form a compensated delay value. In another example, if the difference $(D^j - D_0^j)$ is greater than a predetermined threshold for some j, such as number of samples (e.g., ten samples), then the coefficient $\alpha_j$ is zeroed, and coefficient $\beta$ is appropriately adjusted, such as by decrementing $\beta$ by one.

A compensated delay value Δ formed by delay compensation module 132 can be used to adjust a symbol boundary by adjusting a position of a transform function, such as an FFT in receiver 124 to recover payload data. Furthermore, a compensated delay value formed by delay compensation module 132 can be used for determining a location of computing device 102. In one example, a compensated delay value is communicated to a transmitter (e.g., server 114) for determining a location of computing device 102. Additionally or alternatively, a compensated delay value can be stored in delay data 144 and provided to location module 134 for determining a location of computing device 102.

Location module 134 is representative of functionality configured to determine a location of a device, such as computing device 102. Location module 134 can determine a location of a device in any suitable way. For instance, location module 134 can be communicatively coupled to location system 116 of server 114 through network 104. Location module 134 can provide data to, and receive data from, location system 116. Thus, location module 134 can receive location of access points comprising network 104, store the location data in data storage 138, and together with an indication of round trip time computed from the compensated delay value formed in delay compensation module 132, perform triangulation calculations to determine a location of computing device 102 in 2D or 3D. Additionally or alternatively, location module 134 can communicate a compensated delay value to a transmitter for determining a location of computing device 102. For instance, location module 134 may communicate a compensated delay value to an access point of network 104 (e.g., access point 120) or location system 116 of server 114, or both. Access point 120 of network 104 or location system 116 may determine a location of computing device 102, and communicate the location to computing device 102, which stores the location in data storage 138.

Having considered an example environment, consider now a discussion of an example system usable to compensate for non-linear phase in accordance with one or more aspects of the disclosure.

Example Non-Linear Phase Compensation System

Figure 3:
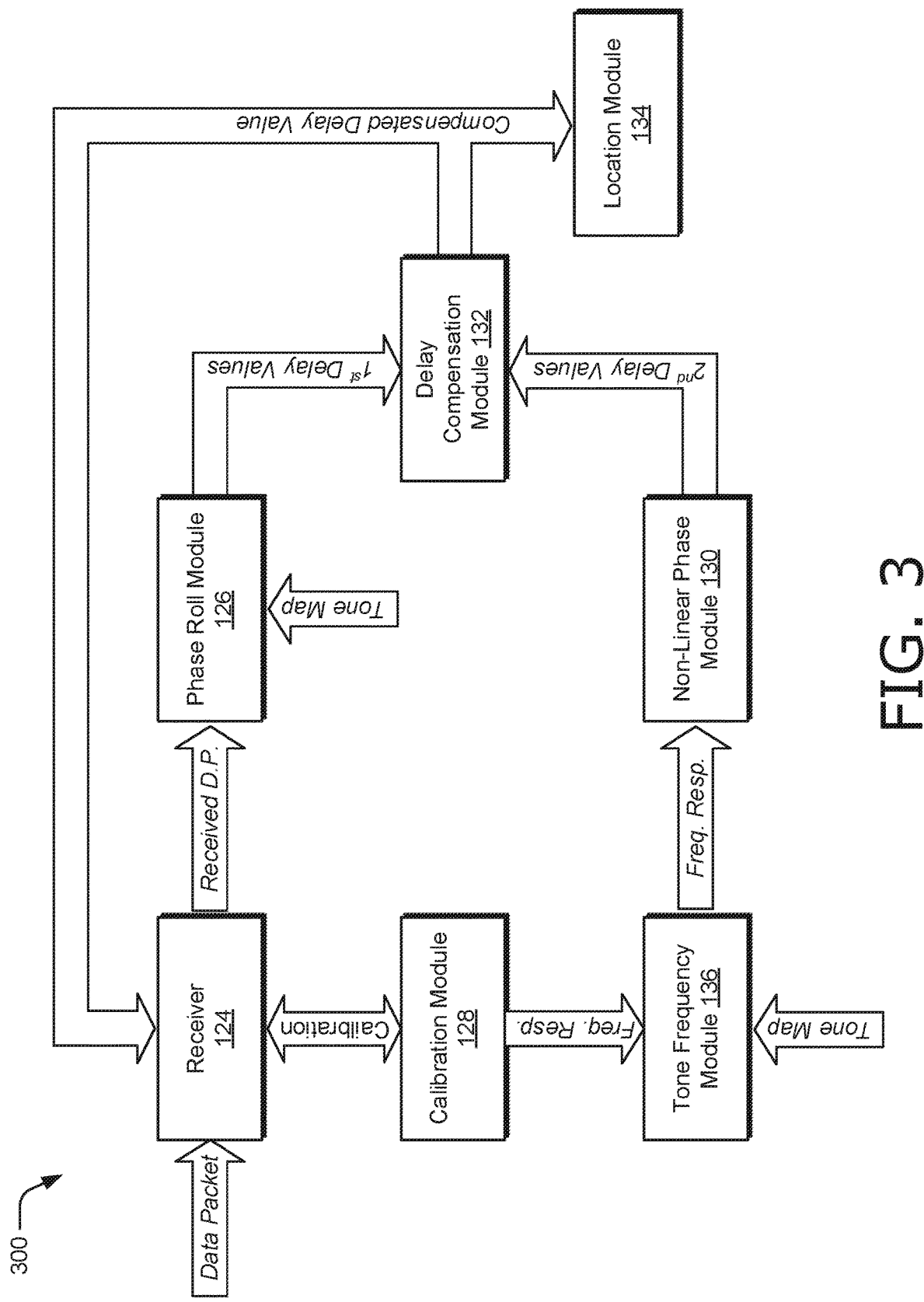
FIG. 3 illustrates an example system usable to compensate for non-linear phase in accordance with one or more aspects of the disclosure.

FIG. 3 illustrates an example system 300 usable to compensate for non-linear phase in accordance with one or more aspects of the disclosure. In this implementation, system 300 includes the modules of non-linear phase compensation system 118 as described in FIG. 1, e.g., receiver 124, phase roll module 126, calibration module 128, non-linear phase module 130, delay compensation module 132, location module 134, and tone frequency module 136. System 300 is one example of non-linear phase compensation system 118 that can be constructed using the modules of non-linear phase compensation system 118. For instance, signals can be redefined, and modules can be modified, combined, or divided to form a modified system, without altering the functionality of system 300. Accordingly, such modified systems are considered to be within the scope of the disclosure.

Furthermore, for simplicity system 300 is limited to the modules of non-linear phase compensation system 118 and a description of some of their interconnects. System 300 can, however, include any suitable signals and communications between modules omitted for simplicity. Such signals may include system clocks, counters, frame indicators, reset signals, user inputs, header boundaries, training field indicators, modulation indicators, frequency control words, and the like.

Moreover, system 300 can be implemented on any suitable device or devices. In one example, system 300 is implemented on one computing device, such as computing device 102 in FIG. 1. In one example, system 300 is implemented by an access point of a network, such as access point 120 in FIG. 1. Additionally or alternatively, system 300 is implemented on more than one device. For instance, parts of system 300 can be implemented by a first computing device, such as computing device 102 or access point 120 in FIG. 1, and other parts of system 300 can be implemented by an additional computing device or devices. In one example, a server implements parts of system 300, such as server 114 in FIG. 1. The server can be remote from the first computing device, e.g., not collocated with the first user computing device. The server may be configured to receive signals of system 300 from the first computing device, process the received signals, such as with location system 116, and transmit results of the processing back to the first computing device. Hence, location system 116 of server 114 in FIG. 1 may include system 300.

Additionally or alternatively, parts of system 300 can be implemented by an additional computing device that is collocated with the first computing device. For instance, computing device 102 may include multiple communicatively coupled computing devices operated by a user, such as a smart phone and a watch, which share or divide processing requirements of system 300. For instance, a watch may be coupled to a smart phone and determine that a smart phone includes more available processing resources, and responsive to this determination, processing for parts of system 300 may be offloaded from the watch to the smart phone.

In system 300, receiver 124 receives a data packet. The data packet can be received in a stream or burst of data packets. Receiver 124 can process the data packet in any suitable way to form a received data packet (indicated by "Received D.P." in FIG. 3) and provide the received data packet to phase roll module 126. In one example, receiver 124 performs carrier recovery (e.g., carrier synchronization of analog and/or digital circuits included in receiver 124) and gain control based on a first training field included in the data packet.

Phase roll module 126 obtains the received data packet from receiver 124, and also has access to a tone map. Based on frequencies indicated in the tone map, phase roll module 126 determines a first delay value for data in the received data packet. For instance, phase roll module can determine a first delay value for each training field in the received data packet using frequencies in the tone map for each training field. In one example, an inner product of channel frequency response values selected according to the tone map and a shifted version of the channel frequency response values is formed, and the first delay value is determined from the angle of the inner product. A first delay value for one or more training fields in the received data packet can be formed in this way, and provided to delay compensation module 132.

Calibration module 128 obtains frequency response values from receiver 124, such as by running a calibration routine on or with receiver 124. The frequency response values are indicative of a non-linear phase response of a data path of receiver 124. In one example, the calibration routine is performed on receiver 124 to determine the frequency response values by injecting data into, and measuring data out of receiver 124, as described above. The calibration routine can be performed when receiver 124 is offline, during manufacture of receiver 124, responsive to receiver 124 being inactive for a predetermined amount of time, when an event occurs (e.g., at pre-determined times or time intervals, when the receiver 124 is powered off, expiration of a previously obtained set of frequency response values, a software upgrade performed on receiver 124, and the like. Calibration module 128 provides the frequency response values (e.g., pre-determined frequency response values) to tone frequency module 136.

Tone frequency module 136 selects frequency response values from among those frequency response values obtained by calibration module 128. In one example, tone frequency module 136 selects frequency response values using the tone map used by phase roll module 126 to obtain a first delay value. Hence, the frequency response values selected by tone frequency module 136 correspond to the same frequencies (e.g., subcarriers) used to determine the first delay value obtained by phase roll module 126.

In one example, tone frequency module 136 selects frequency response values according to a different tone map for each of a plurality of training fields, such as for each training field in a data packet received by receiver 124. Tone frequency module 136 supplies selected frequency response values to non-linear phase module 130.

Non-linear phase module 130 receives selected frequency response values from tone frequency module 136 and determines a second delay value from the selected frequency response values. Since tone frequency module 136 can select a subset of the frequency response values obtained by calibration module 128, non-linear phase module 130 can determine a second delay value from a subset of frequency response values obtained by calibration module 128, such as a subset corresponding to frequencies of subcarriers in a training field. Accordingly, a second delay value determined by non-linear phase module 130 can be determined for a same set of frequencies as a first delay value determined by phase roll module 126.

Furthermore, non-linear phase module 130 can determine a second delay value for each set of frequency response values it receives from tone frequency module 136. For instance, non-linear phase module 130 can determine a respective second delay value for each one of a plurality of training fields. Hence, each second delay value determined by non-linear phase module 130 can be determined for a respective same set of frequencies as a respective first delay value determined by phase roll module 126.

Non-linear phase module 130 can determine a second delay value in any suitable way based on the selected frequency response values from tone frequency module 136. In one example, non-linear phase module 130 determines a second delay value by forming an inner product of frequency response values and a shifted version of frequency response values, and calculating an angle of the inner product, as described above. Non-linear phase module 130 provides one or more second delay values determined by non-linear phase module 130 to delay compensation module 132.

Delay compensation module 132 forms a compensated delay value from one or more first delay values provided from phase roll module 126 and one or more second delay values provided by non-linear phase module 130. For instance, delay compensation module 132 subtracts a respective second delay value from a respective first delay value to form one or more intermediate delay values. Delay compensation module 132 can form a compensated delay value from the intermediate delay values in any suitable way. In one example, delay compensation module 132 selects one of the intermediate delay values as the compensated delay value. In another example, delay compensation module 132 combines multiple intermediate delay values to form the compensated delay value, such as by averaging intermediate delay values to form the compensated delay value.

A compensated delay value calculated by delay compensation module 132 has the error in the delay caused by a non-linear phase response of receiver 124 removed. Thus, a compensated delay value calculated by delay compensation module 132 is provided to receiver 124, so that receiver 124 can adjust a timing estimate, such as by adjusting a symbol boundary by changing a position of an FFT window to extract payload data based on the compensated delay value. Furthermore, a compensated delay value calculated by delay compensation module 132 is provided to location module 134 to support timing calculations for location services.

Location module 134 receives a compensated delay value from delay compensation module 132 and supports location capabilities in any suitable way. In one example, location module 134 is configured to communicate a compensated delay value to a transmitter for determining a location of receiver 124. For instance, the transmitter may be an access point in a WLAN or a remote server communicatively coupled to location module 134 via a network. Additionally or alternatively, location module 134 can be configured to determine a location of receiver 124 based on an indication of round trip time computed from the compensated delay value. For instance, location module 134 may transmit a compensated delay value to a transmitter which computes a round trip time from the compensated delay, and transmits an indication of the round trip time back to location module 134. Location module 134 can solve triangulation equations using the indication of round trip time for a location of receiver 124. Location module 134 may also be configured to receive information from a transmitter, such as an access point in a network or a server connected to a network, and compute a round trip time from the information. For instance, a transmitter may provide time stamps and location information (e.g., locations of access points) to location module 134, which solves triangulation equations for a location of receiver 124 using the time stamps and location information.

System 300 constitutes an improvement over current systems which do not compensate for frequency-dependent delays induced by non-linear phase responses for specific devices, and thus are not suitable for supporting location services requiring accurate timing estimates, such as for sub-meter location. In contrast, system 300 compensates for frequency-dependent delays induced by non-linear phase responses using calibration data for a specific device, thus removing frequency-dependent errors in delay calculations. Furthermore, system 300 supports combining of multiple delay values that may be obtained for different training fields using different tone maps, without the adverse effects of errors caused by frequency-dependent delays induced by non-linear phase responses. Thus, system 300 is suitable for supporting location services requiring accurate timing estimates, such as for sub-meter location.

Having considered an example system 300, consider now a discussion of example procedures for non-linear phase compensation in accordance with one or more aspects of the disclosure.

Example Procedures

FIG. 4 illustrates an example procedure 400 for non-linear phase compensation in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects the procedure may be performed in an environment by a suitably configured device, such as the example computing device 102 or access point 120 of FIG. 1 that makes use of a non-linear phase compensation system, such as non-linear phase compensation system 118. A non-linear phase compensation system implementing procedure 400 may be an independent application that has been installed on a device (e.g., computing device 102 or access point 120), a service hosted by a service provider that is accessible by computing device 102 or access point 120, a plug-in module to computing device 102 or access point 120, or combinations thereof.

A first delay value is obtained (block 402). The first delay value is determined for a plurality of frequencies in a tone map. The first delay can be obtained by a phase roll module. In an example, the plurality of frequencies in the tone map are not consecutive frequencies in the tone map. For instance, the plurality of frequencies can skip or omit some frequencies (e.g., frequencies of unused subcarriers can be skipped in the plurality of frequencies). The plurality of frequencies can be a subset of frequencies in the tone map.

In one example, a data packet is received, and channel frequency values are determined from a training field in the data packet for the plurality of frequencies. An inner product of the channel frequency values and a shifted version of the channel frequency values is formed, and the first delay value is obtained from an angle of the inner product.

Pre-determined frequency response values are obtained (block 404). The pre-determined frequency response values are indicative of a non-linear phase response, such as a non-linear phase response of a data path of a receiver. The pre-determined frequency response values can be obtained by a calibration module. The pre-determined frequency response values can be pre-determined by measuring at least one frequency response of a data path of a receiver when the receiver is offline. Additionally or alternatively, the pre-determined frequency response values can be determined as part of a calibration routine executed responsive to the receiver waking up from an inactive state.

A second delay value is determined from at least some of the pre-determined frequency response values (block 406). Each of the at least some of the pre-determined frequency response values are determined for a respective one of the plurality of frequencies in the tone map. In one example, an inner product of the at least some of the pre-determined frequency response values and a shifted version of the at least some of the pre-determined frequency response values is formed, and the second delay value is determined from an angle of the inner product. A non-linear phase module can determine the second delay.

The second delay value is subtracted from the first delay value to form a compensated delay value (block 408). A delay compensation module can subtract the second delay value from the first delay value. The compensated delay value has the error in the delay caused by the non-linear phase response removed by subtracting the second delay value from the first delay value.

In one example, the compensated delay value is communicated to a transmitter for determining a location of a device. Additionally or alternatively, a symbol boundary is adjusted based on the compensated delay value by adjusting a position of a transform function, such as an FFT, by an amount determined from the compensated delay value.

Moreover, the compensated delay value can be combined with an additional compensated delay value. The compensated delay value and the additional compensated delay value can correspond to different training fields of a same received data packet. Furthermore, the additional compensated delay value can be determined for a different plurality of frequencies in the tone map than the plurality of frequencies.

Figure 5:
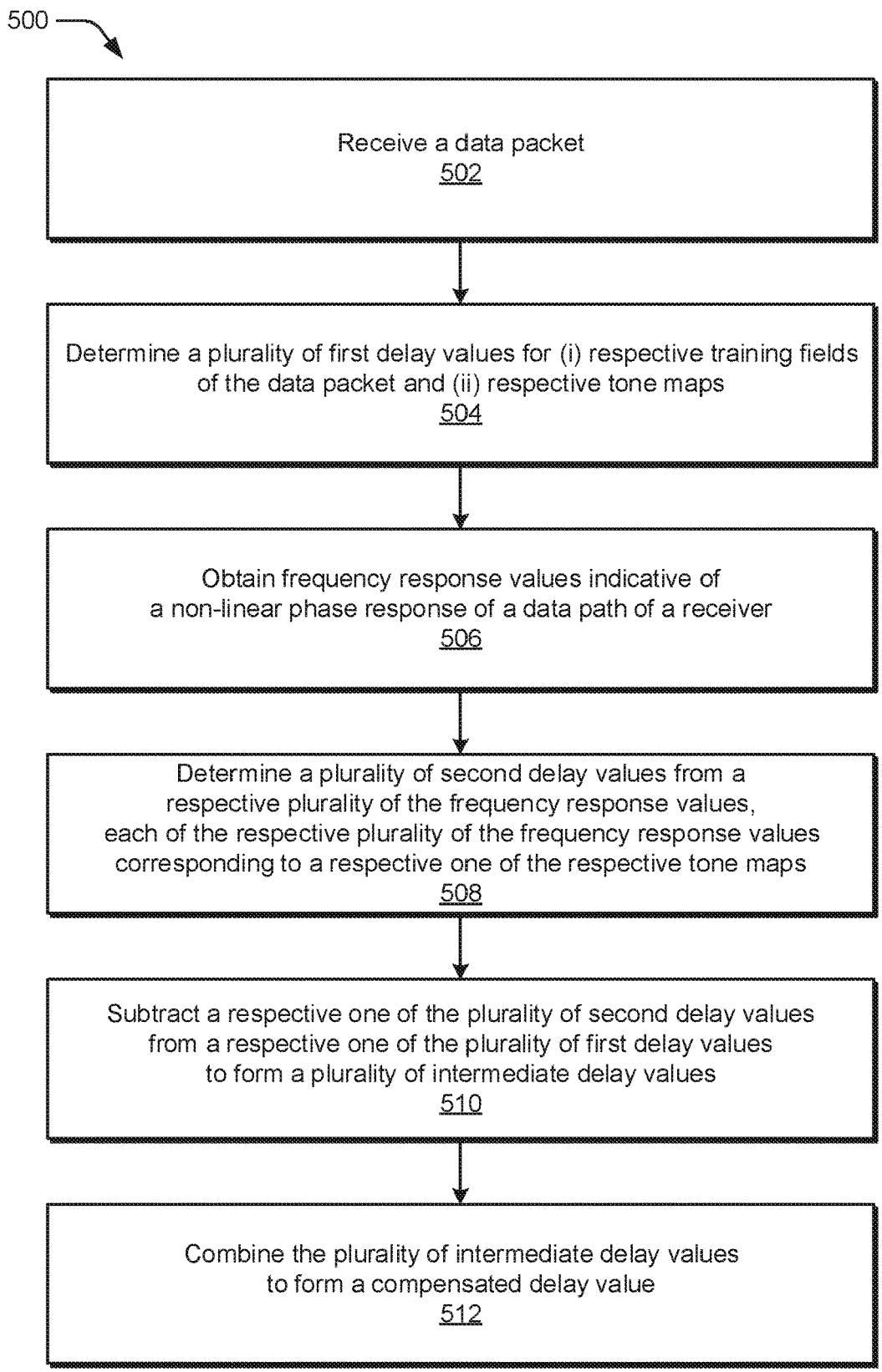
FIG. 5 is a flow diagram depicting an example procedure in accordance with one or more aspects of the disclosure.

FIG. 5 illustrates an example procedure 500 for non-linear phase compensation in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects the procedure may be performed in an environment by a suitably configured device, such as the example computing device 102 or access point 120 of FIG. 1 that makes use of a non-linear phase compensation system, such as non-linear phase compensation system 118. A non-linear phase compensation system implementing procedure 500 may be an independent application that has been installed on a device (e.g., computing device 102 or access point 120), a service hosted by a service provider that is accessible by computing device 102 or access point 120, a plug-in module to computing device 102 or access point 120, or combinations thereof.

A data packet is received (block 502). For instance, a receiver can be configured to receive the data packet. The data packet can include a plurality of training fields, each using subcarriers according to a different tone map.

A plurality of first delay values are determined for (i) respective training fields of the data packet and (ii) respective tone maps (block 504). For instance, a phase roll module can be configured to determine the plurality of first delay values, one per training field.

Frequency response values are obtained indicative of a non-linear phase response of a data path of a receiver (block 506). In one example, the frequency response values are determined with a calibration module by injecting an input signal into an input of the data path of the receiver, measuring an output signal caused by the injecting from an output of the data path of the receiver, and comparing the output signal with the input signal. Additionally or alternatively, the frequency response values can be obtained from a database of frequency response values based on an identification number of the receiver (e.g., a model number or a unique identifier of the receiver, such as a serial number). The database can be maintained by a server and accessed to obtain the frequency response values, responsive to successful authentication of the identification number by the server to the receiver.

A plurality of second delay values is determined from a respective plurality of the frequency response values (block 508). Each of the respective plurality of the frequency response values correspond to a respective one of the respective tone maps. A non-linear phase module can be configured to determine the plurality of second delay values. In one example, at least one of the respective tone maps skips or omits some frequencies so that the at least one of the respective tone maps represents unevenly spaced frequencies (e.g., the frequencies have non-uniform spacings between them).

A respective one of the plurality of second delay values is subtracted from a respective one of the plurality of first delay values to form a plurality of intermediate delay values (block 510). A delay compensation module can be configured to perform the subtractions.

The plurality of intermediate delay values are combined to form a compensated delay value (block 512). A delay compensation module can be configured to combine the plurality of intermediate delay values.

A receiver can also be configured to make a determination whether a performance metric of the receiver is satisfactory, and adjust, responsive to the determination being that the performance metric is not satisfactory, a symbol boundary in data of the data packet based on the compensated delay value by adjusting a position in the data of a frequency-domain transform function. Additionally or alternatively, a location module can be configured to communicate the compensated delay value to a transmitter for determining a location of the receiver.

Figure 6:
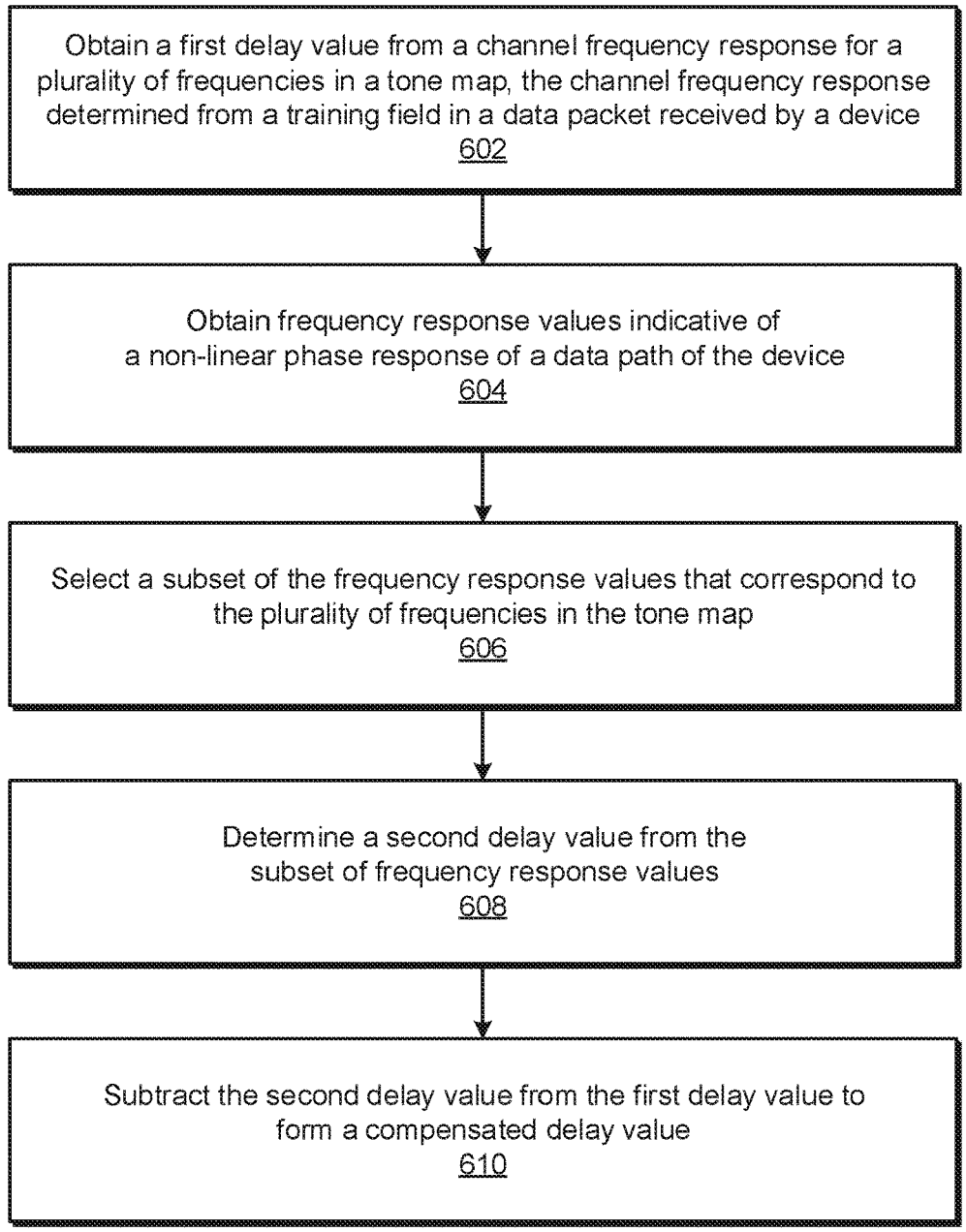
FIG. 6 is a flow diagram depicting an example procedure in accordance with one or more aspects of the disclosure.

FIG. 6 illustrates an example procedure 600 for non-linear phase compensation in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects the procedure may be performed in an environment by a suitably configured device, such as the example computing device 102 or access point 120 of FIG. 1 that makes use of a non-linear phase compensation system, such as non-linear phase compensation system 118. A non-linear phase compensation system implementing procedure 600 may be an independent application that has been installed on a device (e.g., computing device 102 or access point 120), a service hosted by a service provider that is accessible by computing device 102 or access point 120, a plug-in module to computing device 102 or access point 120, or combinations thereof.

A first delay value is obtained from a channel frequency response for a plurality of frequencies in a tone map (block 602). The channel frequency response is determined from a training field in a data packet received by a device. A phase roll module can be configured to obtain the first delay value.

Frequency response values indicative of a non-linear phase response of a data path of the device are obtained (block 604). For instance, a calibration module can be configured to the obtain frequency response values.

A subset of the frequency response values that correspond to the plurality of frequencies in the tone map is selected (block 606). A tone frequency module can be configured to select the subset of the frequency response values. The subset can be selected so that the frequencies at which the frequency response values of the subset are evaluated are the same frequencies as the plurality of frequencies in the tone map used to determine the first delay value.

A second delay value is determined from the subset of frequency response values (block 608). A non-linear phase module can be configured to determine the second delay value. In one example, the second delay value is determined by forming an inner product of the subset of frequency response values and a shifted version of the subset of frequency response values and calculating an angle of the inner product.

The second delay value is subtracted from the first delay value to form a compensated delay value (block 610). A delay compensation module can be configured to perform the subtraction. The compensated delay value can be combined with an additional compensated delay value, the compensated delay value and the additional compensated delay value corresponding to different training fields of the data packet, the additional compensated delay value being determined for a different plurality of frequencies than the plurality of frequencies. Furthermore, a location module can be configured to determine a location of a device based on an indication of round trip time computed from the compensated delay value.

The procedures described herein constitute an improvement over current procedures which do not compensate for frequency-dependent delays induced by non-linear phase responses for specific devices, and thus are not suitable for supporting location services requiring accurate timing estimates, such as for sub-meter location. In contrast, procedures described herein compensate for frequency-dependent delays induced by non-linear phase responses using calibration data for a specific device, thus removing frequency-dependent errors in delay calculations. Furthermore, procedures described herein support combining of multiple delay values that may be obtained for different training fields using different tone maps, without the adverse effects of errors caused by frequency-dependent delays induced by non-linear phase responses. Thus, procedures described herein are suitable for supporting location services requiring accurate timing estimates, such as for sub-meter location.

Having considered example procedures in accordance with one or more implementations, consider now a discussion of an example device having components through which aspects of compensating for non-linear phase can be implemented.

Example Device

Figure 7:
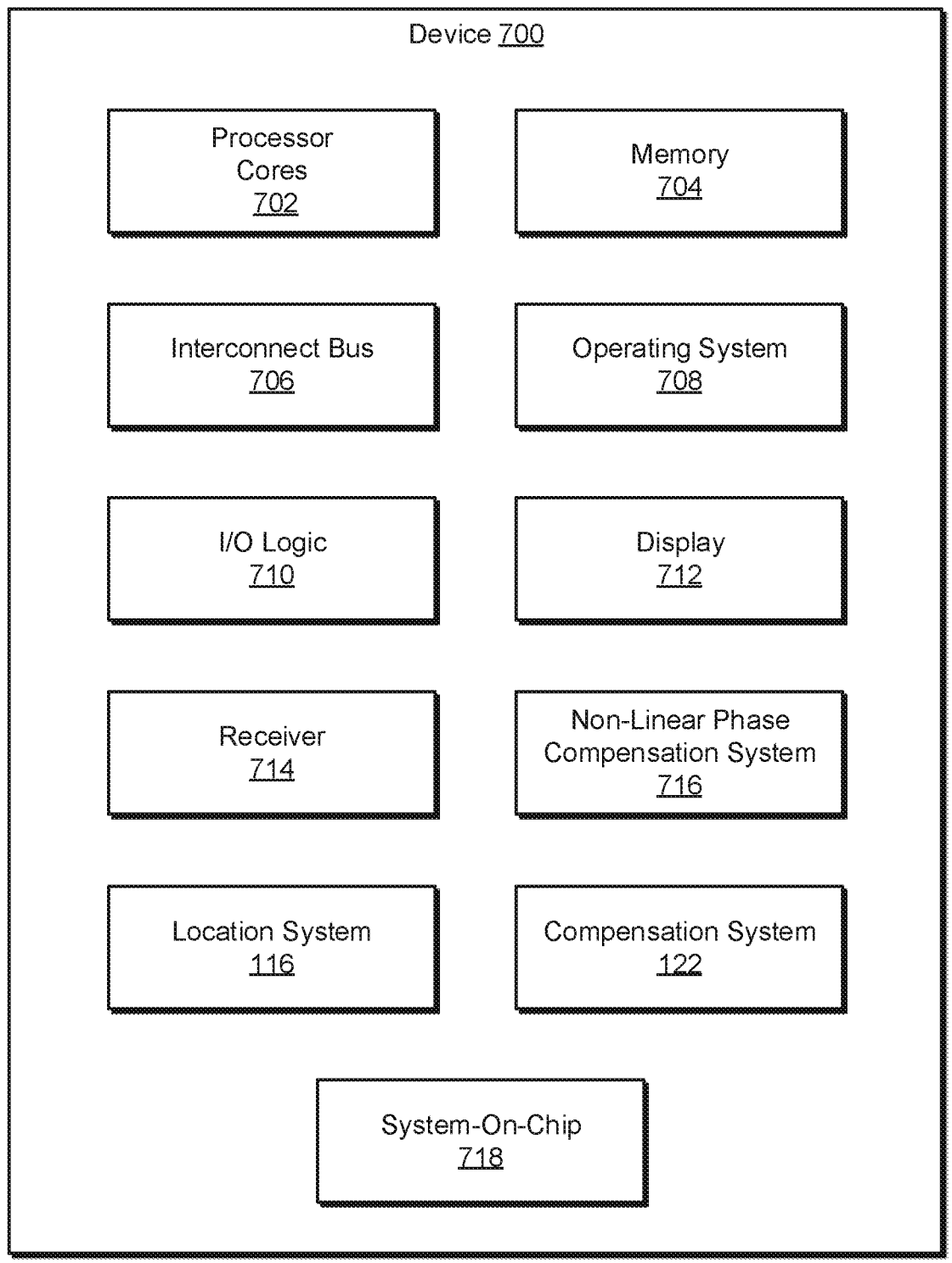
FIG. 7 illustrates an example device having components through which aspects of compensating for non-linear phase can be implemented in accordance with one or more aspects of the disclosure.

FIG. 7 illustrates an example device 700, which includes components capable of implementing aspects of compensating for a non-linear phase response. Device 700 may be implemented as, or in, any suitable electronic device, such as a computer, processor, a modem, broadband router, access point, cellular phone, smart-phone, gaming device, laptop computer, desktop computer, net book, set-top-box, smart-watch, virtual reality goggles, network-attached storage (NAS) device, cell tower, satellite, cable head-end, sensor in a vehicle, and/or any other device that may compensate for non-linear phase.

Device 700 may be integrated with a microprocessor, storage media, I/O logic, data interfaces, logic gates, a transmitter, a receiver, circuitry, firmware, software, and/or combinations thereof to provide communicative or processing functionalities. Device 700 may include a data bus (e.g., cross bar or interconnect fabric) enabling communication between the various components of the device. In some aspects, components of device 700 may interact via the data bus to implement aspects of compensating for non-linear phase.

In this particular example, device 700 includes processor cores 702 and memory 704. Memory 704 may include any suitable type of memory, such as volatile memory (e.g., DRAM), non-volatile memory (e.g., flash), cache, and the like. In the context of this disclosure, memory 704 is implemented as a storage medium, and does not include transitory propagating signals or carrier waves. Memory 704 can store data and processor-executable instructions of device 700, such as operating system 708 and other applications. Memory 704 can also store tone map data, frequency response data, delay data, training data, location data, and the like. Data storage 138 in FIG. 1 is an example of memory 704.

Processor cores 702 may execute operating system 708 and other applications from memory 704 to implement functions of device 700, the data of which may be stored to memory 704 for future access. For example, processor cores 702 may perform some functions of system 300 in FIG. 3, such as determining a first delay value or a second delay value. Device 700 may also include I/O logic 710, which can be configured to provide a variety of I/O ports or data interfaces for communication. Device 700 also includes display 712. Display 712 may include any suitable type of display, such as a liquid crystal display (LCD), touchscreen, and the like, and be configured to provide a user interface on device 700.

Device 700 also includes receiver 714. Receiver 124 in FIG. 1 and FIG. 3 is an example of receiver 714. Device 700 also includes non-linear phase compensation system 716. Non-linear phase compensation system 118 in FIG. 1 and system 300 in FIG. 3 are examples of non-linear phase compensation system 716. Device 700 also includes location system 116 and compensation system 122 in FIG. 1.

Device 700 also includes System-on-Chip (SoC) 718. SoC 718 comprises a variety of functions on a single chip or die, or multiple die in a single package. In embodiments, SoC comprises receiver 714 and non-linear phase compensation system 716.

In one or more exemplary embodiments, the functions described may be implemented in hardware, software, firmware, or any combination thereof. If implemented in software, functions may be stored on a computer-readable storage medium (CRM). In the context of this disclosure, a computer-readable storage medium may be any available medium that can be accessed by a general-purpose or special-purpose computer that does not include transitory propagating signals or carrier waves. By way of example, and not limitation, such media can comprise RAM, ROM, EEPROM, CD-ROM or other optical disk storage, magnetic disk storage, or other magnetic storage devices, or any other non-transitory medium that can be used to carry or store information that can be accessed by a general-purpose or special-purpose computer, or a general-purpose or special-purpose processor. The information can include any suitable type of data, such as computer-readable instructions, sampled signal values, data structures, program components, or other data. These examples, and any combination of storage media and/or memory devices, are intended to fit within the scope of non-transitory computer-readable media. Disk and disc, as used herein, includes compact disc (CD), laser disc, optical disc, digital versatile disc (DVD), floppy disk and Blu-ray disc where disks usually reproduce data magnetically, while discs reproduce data optically with a laser. Combinations of the above should also be included within the scope of computer-readable media.

Firmware components include electronic components with programmable memory configured to store executable instructions that direct the electronic component how to operate. In some cases, the executable instructions stored on the electronic component are permanent, while in other cases, the executable instructions can be updated and/or altered. At times, firmware components can be used in combination with hardware components and/or software components.

The term "component", "module", and "system" are intended to refer to one or more computer related entities, such as hardware, firmware, software, or any combination thereof, as further described above. At times, a component may refer to a process and/or thread of execution that is defined by processor-executable instructions. Alternately or additionally, a component may refer to various electronic and/or hardware entities.

Certain specific embodiments are described above for instructional purposes. The teachings of this disclosure have general applicability, however, and are not limited to the specific embodiments described above.

Conclusion

Systems and techniques for compensating for non-linear phase responses and resulting frequency-dependent group delay using data for a specific device are described. The error in the delay value of a channel determined from a received data packet due to frequency-dependent group delay is removed by subtracting a delay value determined from measurements of a specific device from the delay value of the channel. Furthermore, compensated delay values are calculated for multiple training fields in the received data packet, enabling combining of delay values determined from different training fields that may operate at different frequencies (e.g., with different subcarriers). Hence, the systems and techniques described herein are suitable to provide accurate timing estimates that support calculations for location functions, such as sub-meter location of a device using a WLAN.

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. A method of compensating for non-linear phase of a filter, the method comprising:
   receiving a data packet;
   determining, for a plurality of frequencies, channel frequency response values from a training field of the data packet, the plurality of frequencies being a subset of frequencies in a tone map;
   forming an inner product of the channel frequency response values and a shifted version of the channel frequency response values;
   determining a first delay value based on an angle of the inner product;
   obtaining pre-determined frequency response values indicative of a non-linear phase response;
   determining a second delay value from at least some of the pre-determined frequency response values, each of the at least some of the pre-determined frequency response values determined for a respective one of the plurality of frequencies in the tone map; and
   subtracting the second delay value from the first delay value to form a compensated delay value.

2. The method as recited in claim 1, further comprising communicating the compensated delay value to a transmitter for use in determining a location of a device.

3. The method as recited in claim 1, further comprising adjusting a symbol boundary based on the compensated delay value by adjusting a position of a transform function.

4. The method as recited in claim 1, wherein the pre-determined frequency response values are pre-determined by measuring at least one frequency response of a data path of a receiver when the receiver is offline.

5. The method as recited in claim 4, wherein the pre-determined frequency response values are determined as part of a calibration routine executed responsive to the receiver waking up from an inactive state.

6. The method as recited in claim 1, wherein the inner product is a first inner product and the determining the second delay value comprises:
   forming a second inner product of the at least some of the pre-determined frequency response values and a shifted version of the at least some of the pre-determined frequency response values; and
   determining the second delay value from an angle of the second inner product.

7. The method as recited in claim 1, wherein the plurality of frequencies in the tone map are not consecutive frequencies in the tone map.

8. The method as recited in claim 1, further comprising combining the compensated delay value with an additional compensated delay value, the compensated delay value and the additional compensated delay value corresponding to different training fields of the received data packet.

9. The method as recited in claim 8, wherein the additional compensated delay value is determined for a different plurality of frequencies in the tone map than the plurality of frequencies.

10. A system for compensating for non-linear phase of a filter, the system comprising:
    a receiver configured to receive a data packet that includes a training field;
    a phase roll module configured to:
       determine, for a plurality of frequencies, channel frequency response values for the training field of the data packet, the plurality of frequencies being a subset of frequencies in a tone map;
       form an inner product of the channel frequency response values and a shifted version of the channel frequency response values;
       determine a first delay value for the training field based on an angle of the inner product;
    a calibration module configured to obtain frequency response values indicative of a non linear phase response of a data path of the receiver;
    a non-linear phase module configured to determine a second delay value from at least some of the frequency response values, each of the at least some of the frequency response values corresponding to a respective one of the plurality of frequencies in the tone map; and
    a delay compensation module configured to subtract the second delay value from the first delay value to form a compensated delay value.

11. The system as recited in claim 10, further comprising a location module configured to communicate the compensated delay value to a transmitter for use in determining a location of the receiver.

12. The system as recited in claim 10, wherein the receiver is further configured to:
    make a determination whether a performance metric of the receiver is satisfactory; and
    adjust, responsive to the determination being that the performance metric is not satisfactory, a symbol boundary in data of the data packet based on the compensated delay value by adjusting a position in the data of a frequency-domain transform function.

13. The system as recited in claim 10, wherein the tone map skips or omits some frequencies so that the tone map represents unevenly spaced frequencies.

14. The system as recited in claim 10, wherein the frequency response values are determined by:
    injecting an input signal into an input of the data path of the receiver;
    measuring an output signal, caused by the injecting, from an output of the data path of the receiver; and
    comparing the output signal with the input signal.

15. The system as recited in claim 10, wherein the frequency response values are obtained from a database of frequency response values based on an identification number of the receiver.

16. A device for compensating for non-linear phase of a filter, the device comprising:
    a phase roll module configured to:
       determine, for a plurality of frequencies, channel frequency response values from a training field of a data packet received by the device, the plurality of frequencies being a subset of frequencies in a tone map;
       form an inner product of the channel frequency response values and a shifted version of the channel frequency response values;
       determine a first delay value based on an angle of the inner product;
    a calibration module configured to obtain frequency response values indicative of a non-linear phase response of a data path of the device;

a tone frequency module configured to select a subset of the frequency response values that correspond to the plurality of frequencies in the tone map;

a non-linear phase module configured to determine a second delay value from the subset of frequency response values; and a delay compensation module configured to subtract the second delay value from the first delay value to form a compensated delay value.

17. The device as recited in claim 16, further comprising a location module configured to determine a location of the device based on an indication of round trip time computed with the compensated delay value.

18. The device as recited in claim 16, wherein the inner product is a first inner product and the non-linear phase module is further configured to determine the second delay value by:

forming a second inner product of the subset of frequency response values and a shifted version of the subset of frequency response values and calculating an angle of the inner product.

19. The device as recited in claim 16, wherein the delay compensation module is further configured to combine the compensated delay value with an additional compensated delay value, the compensated delay value and the additional compensated delay value corresponding to different training fields of the data packet, the additional compensated delay value being determined for a different plurality of frequencies than the plurality of frequencies.

20. The device as recited in claim 16, wherein:

the frequency response values are pre-determined frequency response values that the calibration module is further configured to determine by measuring at least one frequency response of a data path of a receiver when the receiver is offline; or the pre-determined frequency response values are determined as part of a calibration routine executed by the calibration module in response to the receiver waking up from an inactive state.

\* \* \* \* \*